March 12, 1957     A. A. POLLIA     2,784,990
PIPE COUPLINGS WITH KEYED-ON FLANGES
Filed March 19, 1953
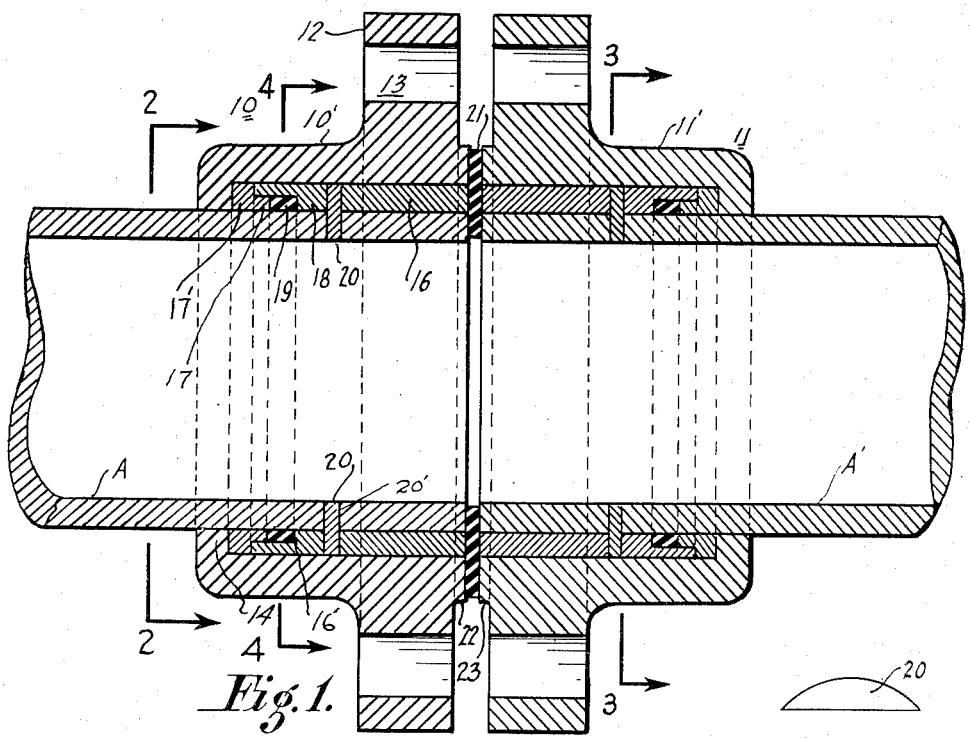
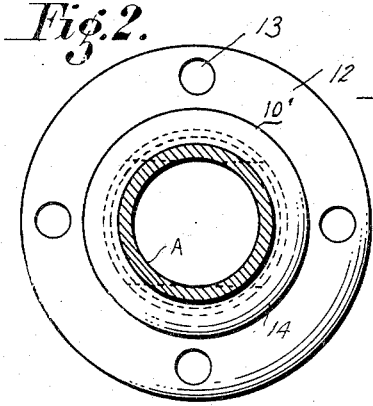
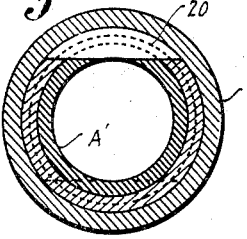
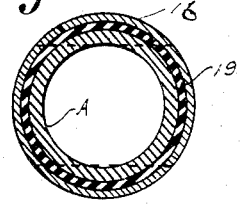
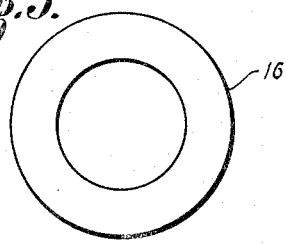
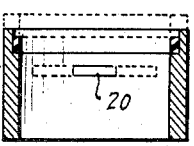
INVENTOR.
A. A. Pollia
BY Edward C. Healy
ATTORNEY United States Patent Office 2,784,990
Patented Mar. 12, 1957

2,784,990

PIPE COUPLINGS WITH KEYED-ON FLANGES

Andrew A. Pollia, San Francisco, Calif.

Application March 19, 1953, Serial No. 343,440

2 Claims. (Cl. 285—368)

This invention relates to improvements in pipe couplings that serve to connect oppositely disposed pipe sections one to the other, and proposes a pipe coupling which is more especially applicable to gas lines or to pipe systems of similar character, wherein air, gas, or other elastic fluid is maintained at a low and relatively high pressure in the pipes.

The principal object of the present invention is to provide a pipe coupling of simple character wherein efficient provision is made against the escape or leakage of the gas or other fluid maintained in the pipe, wherein allowance is made for the expansion and contraction of the pipes; and which shall be of simple character and relatively small cost.

A further object of the invention is to provide in the present construction the elimination of all welding and also a threading of the pipe sections for sealing the same one to the other, and provides means whereby the pipe sections can be readily dismantled one from the other. Accordingly, in the event one of the pipes should become damaged or deteriorate from any cause, a new pipe section can easily be substituted and readily secured to the opposite section.

An additional object of the invention is to provide keys or locking means for locking the coupling, the caps and pipes one to the other and to provide suitable gaskets to eliminate any danger of leakage.

A further object of the invention is the provision of a pipe coupling of the character described that is exceedingly durable, simple in construction, economical to manufacture and highly efficient and serviceable in use.

Other objects and advantages will be apparent during the course of the following description.

In the accompanying drawings forming a part of this specification and wherein for the purpose of illustration is shown the preferred embodiment of the invention, Fig. 1 is a longitudinal vertical sectional view of a coupling constructed in accordance with my invention, and that is adapted to couple the adjacent ends of a pair of pipe sections.

Fig. 2 is a vertical sectional view through one of the pipe sections, the view being taken on a line 2—2 of Fig. 2 and looking in the direction of the arrows, Fig. 3 is a vertical sectional view through one of the coupling casings, the view being taken on the line 3—3 of Fig. 1 and looking in the direction of the arrows, Fig. 4 is a similar view on line 4—4 of Fig. 1 and looking in the direction of the arrows, Fig. 5 is a front elevational view of one of the bushing members, Fig. 6 is a cross-sectional view of one of the bushing members and disclosing a locking ring and key associated therewith, Fig. 7 is a cross-sectional view of one of the gaskets or packing rings, Fig. 8 is a sectional detail view of one of the locking rings, and Fig. 9 is a front elevational view of one of the key elements.

Referring in detail to the drawing and the numerals thereof, wherein for the purpose of illustration like numerals designate like parts throughout the several views, the pipes to be connected by my improved coupling are indicated by the reference characters A and A'. The coupling comprises two companion members 10 and 11, which are adapted to receive therein the respective pipes A and A' for coupling the adjacent ends of the pipes.

Since the coupling comprises two complementary portions that are alike in construction, only one will be described. For example, the member 10 includes a cylindrical casing or housing 10', having an outwardly extending peripheral collar 12 that is provided with spaced bolt holes 13 therein adapted to receive suitable threaded bolts for threaded locking engagement with conventional threaded nuts.

It will be noted that the said casing is equipped with an annular depending flange 14. Interposed between the casing 10' and the outer periphery of the pipe A is a metallic bushing or sleeve 16 that is reduced at its outer extremity to provide a shoulder 16'.

A packing ring 19 is seated within the reduced extremity of said bushing and is interposed between the shoulder 16' and an internal shoulder 17 of a gland or locking ring 17' that abuts the flange 14.

The numeral 20 indicates a pair of detachable keys, of the configuration illustrated in Fig. 9 of the drawing, that are carried by the bushing and are adapted to be received for locking engagement in oppositely disposed concentric slots 20' formed in the pipe section.

The numeral 21 indicates an intermediate gasket that is positioned between the inner surfaces 22 and 23 of the casings 10' and 11' of the members 10 and 11. By virtue of the construction employed, it will be obvious that I have devised an improved coupling that will positively and durably connect the adjacent ends of pipe sections; which coupling is easy to install, and wherein the parts are readily interchangeable for subsequent use.

It will be obvious that when the nuts are tightened on the bolts, there is a positive compression exerted wherein the three gaskets employed and the cooperating parts eliminate any danger of leakage.

From the foregoing description considered in connection with the accompanying drawing, it will be obvious that I have devised a coupling construction whereby the insertion of the ends of the pipe and the utilization of the locking means will cause an automatic locking of the coupling to the pipe sections and will effect a tightening of the packing to make a fluid or air tight connection, whereby a great saving of time is realized in making a tight joint between the adjacent ends of pipes.

Having thus described my invention, I claim:

1. A coupling for two adjacent pipe sections comprising a pair of unitary and circumferential continuous bushings slidable on the ends of the pipe sections, the pipe sections and the bushings having straight bottom transverse slots brought into registry when the respective ends of the pipe sections and the bushings are brought into registry, said transverse slots extending through only a relatively small chordal section of the pipe sections and the bushings, keys insertable in the slots for interlocking the bushings and the pipe sections, sleeves slidable on the bushings and having inwardly extending flanges at their inner ends to transmit pressure longitudinally to the outer ends of the bushings, a sealing ring interposed between the adjacent ends of the pipe sections and bushings, and confronting outwardly projecting flanges on the outer ends of the sleeves having means for drawing the sleeves and the bushings and the pipe sections upon the interposed sealing ring.

2. A coupling for two adjacent pipe sections comprising a pair of unitary and circumferentially continuous bushings slidable on the ends of the pipe sections, the pipe sections and the bushings having straight bottom transverse slots brought into registry when the respective ends of the sections and the bushings are brought into registry, said transverse slots extending through only a relatively small chordal section of the pipe sections and bushings, keys insertable in the slots for interlocking the bushings and the pipe sections, a sealing ring interposed between the adjacent ends of the pipe sections and bushings, sleeves slidable on the bushings and having extending flanges at their inner ends to transmit pressure longitudinally to the outer ends of the bushings, and confronting outwardly projecting flanges on the outer ends of the sleeves having means for drawing the sleeves and the bushings and the pipe sections upon the interposed sealing ring, said keys being segmental in shape and having curved outer edges registering with the outer circumference of the bushings and having continuous straight inner edges extending transversely of the pipe sections.

References Cited in the file of this patent

UNITED STATES PATENTS

| | | |
|---|---|---|
| 661,352 | Moody | Nov. 6, 1900 |
| 1,851,574 | Fiederlein | Mar. 29, 1932 |
| 1,934,349 | Friend | Nov. 7, 1933 |
| 2,248,269 | Bilde | July 8, 1941 |
| 2,288,225 | Boughton | June 30, 1942 |
| 2,381,962 | Krone | Aug. 14, 1945 |
| 2,413,978 | Krone | Jan. 7, 1947 |
| 2,420,721 | Pennella | May 20, 1947 |
| 2,459,382 | Hollub | Jan. 18, 1949 |
| 2,568,414 | Russ | Sept. 18, 1951 |